Jan. 27, 1931. N. TRBOJEVICH 1,790,608
WORM GEARING
Filed March 17, 1930 2 Sheets-Sheet 1

INVENTOR
Nikola Trbojevich
BY Whittemore Hulbert
Whittemore Belknap
ATTORNEYS

Jan. 27, 1931.   N. TRBOJEVICH   1,790,608
WORM GEARING
Filed March 17, 1930   2 Sheets-Sheet 2
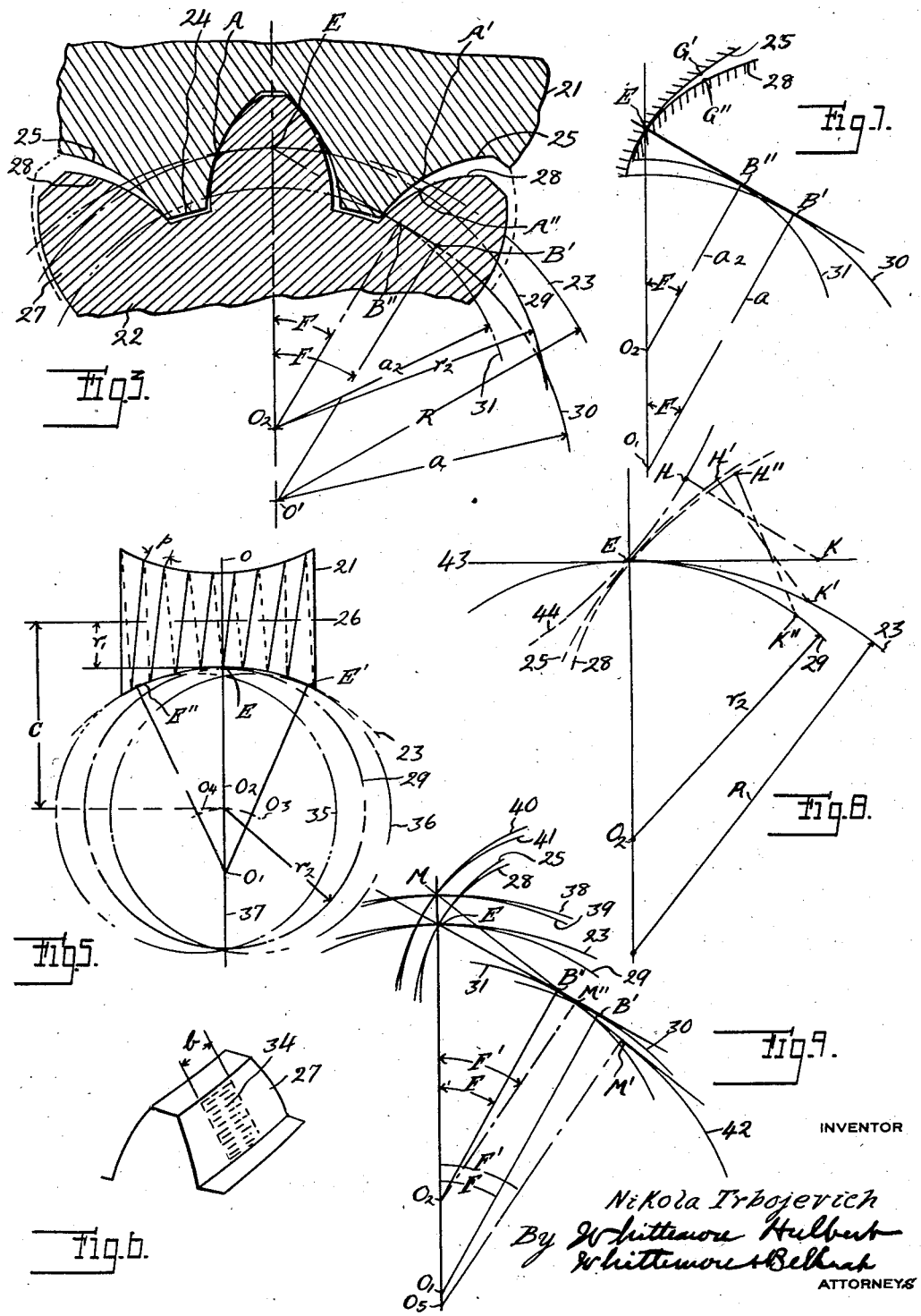

Patented Jan. 27, 1931

1,790,608

UNITED STATES PATENT OFFICE

NIKOLA TRBOJEVICH, OF DETROIT, MICHIGAN

WORM GEARING

Continuation of applications Serial No. 277,693, filed May 14, 1928, and Serial No. 346,232, filed March 11, 1929. This application filed March 17, 1930. Serial No. 436,571.

The invention relates to worm gearing and more particularly to gearing of the globoid or hour-glass type. The application is a continuation of my applications, Serial Nos. 277,693 filed May 14, 1928 and 346,232 filed March 11, 1929.

One of the objects of the invention is to obtain gearing in which the cooperating members may each be displaced axially without losing the correct tangency of the mating surfaces or otherwise interfering with the cooperation of the gears.

Another object is to provide gearing suitable for steering gears in which backlash is eliminated and the gearing is easily operated.

A further object is to provide an improved gearing of the globoid type adapted for various practical uses, and having the advantages hereinafter set forth.

In the drawings

Figure 3 is an enlarged view of the meshing teeth shown in Figs. 1 and 2;

Figures 4 and 5 are diagrams explanatory of the geometric relation existing between the globoid worm and a helical gear.

Figure 6 is a portion of a tooth of the gear member showing the distribution of the contact area in the tooth surface;

Figure 7 is derived from Fig. 3 by rotating the mating tooth curves until they contact at the pitch point of the drive;

Figure 8 is a geometrical diagram showing the principle of conjugacy embodied in this type of gearing;

Figure 9 is a geometrical diagram explaining the possibility of a radial shift of the worm relative to the mating wheel.

Figure 1:
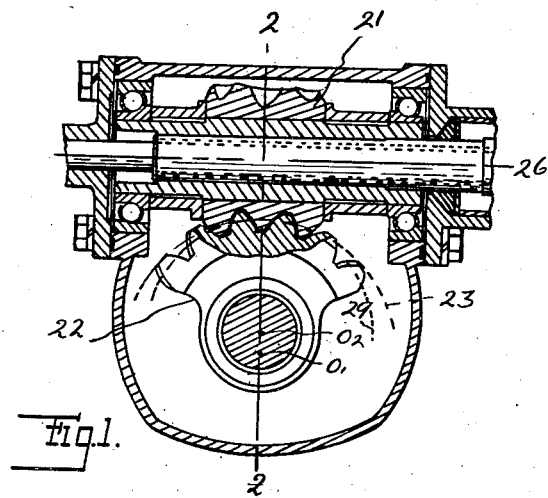
Figure 1 is a section through gearing of the worm and sector type constructed in accordance with my invention, the section being on line 1—1 of Figure 2.
Figure 1A:
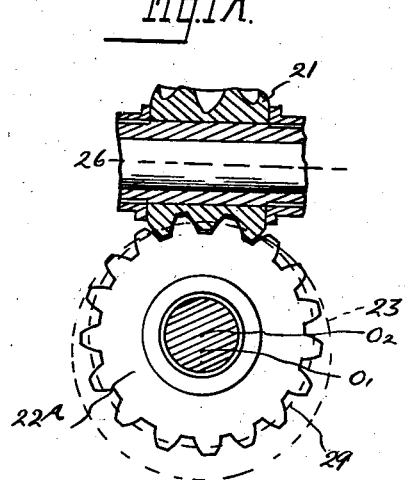
Figure 1A is a similar section through a modified form of gearing adapted for continuous rotation in which the worm wheel has teeth around the complete circumference thereof.
Figure 2:
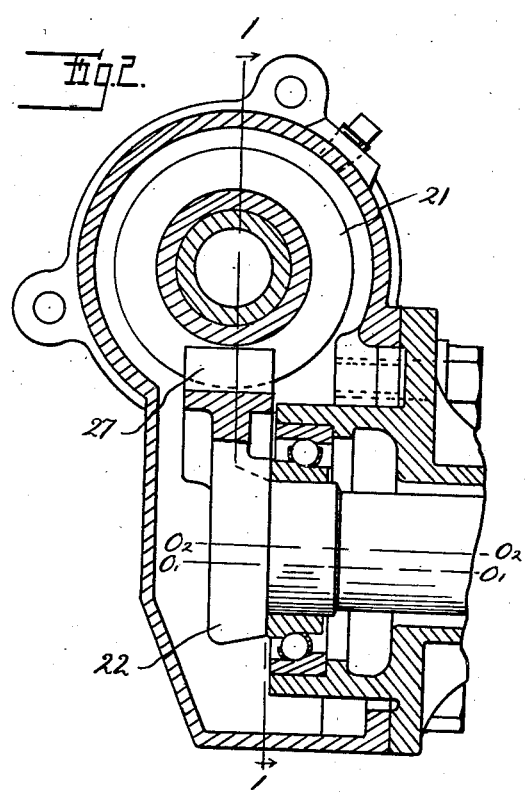
Figure 2 is a section perpendicular to the worm axis taken in the plane 2—2 of Fig. 1.

As shown in Figs. 1 and 2, the pair of my improved mating gears consists of a globoid worm 21 and a mating sector 22 arranged with their shafts at right angles. As shown in Fig. 1A, the worm 21 meshes with a worm wheel 22A, the teeth of which extend completely around the circumference thus permitting continuous rotation. The shafts may be disposed at acute instead of at right angles when so desired.

The globoid worm 21 possesses a concave meridan curve 23 which is a circle struck from the center $O_1$ when the shafts are disposed at right angles and an ellipse when disposed at acute angles. The worm threads 24 having preferably concave cross contours 25 of an ever increasing radius of curvature and still more preferably cross contours of an inverted involute shape, are evenly spaced along the meridian 23, thus forming a plurality of spiral convolutions which are obtained when the worm is rotated about its axis 26 and the generating element is rotated about the axis $O_1$ in a predetermined timed relation.

The sector 22 is a portion of a cylindrical helical gear having an axis $O_2$—$O_2$ and a plurality of uniformly twisted helical teeth 27, said teeth being of a constant cross section throughout their lengths.

As shown in Fig. 3, the center $O_2$ of the sector is eccentrically disposed relatively to the meridian circle 23 of the worm, the pitch circle 29 of the sector contacting with the circle 23 at a point E lying in the line connecting with two centers $O_1$ and $O_2$. The object of this eccentricity is to enable the worm to be shifted lengthwise and to correctly operate in such a new position as it will be hereinafter explained.

The mating tooth curves 25 and 28 are preferably involutes rolled off from the corresponding base circles 30 and 31, the centers of the said circles being again at the points $O_1$ and $O_2$ respectively. The line of action E B'' B' is tangent to both base circles, thus producing the same axial pressure angle F in both gears. It is to be noted that the radius of curvature E B' of the concave involute 25 (see Fig. 7) is greater than the corresponding radius of curvature E B'' of the convex involute 28. This is essential because the discrepancy in the radii of curvature enables me to obtain a tangential mating of the corresponding tooth curves when the two gears for some reason or other are displaced from their original or predetermined positions. The discrepancy of the corresponding radii of curvature of the mating curves 25 and 28 is not limited to the point E alone but extends all along the mating curves at all points thereof. Thus, the radius of curvature at the point G' of the concave curve 25 is always greater than the radius taken at the conjugate point G'' of the convex curve 28.

Figure 4:
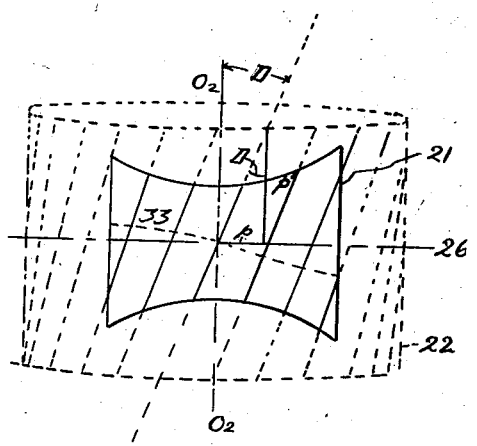

Referring now to Fig. 4, the helix angle D must be the same for the worm 21 and the mating gear 22 when the shafts 26 and $O_2 O_2$ are disposed at right angles. When the two shafts are not at right angles, the two helix angles will be different and specifically so calculated that their difference should be exactly equal to the angle through which one of the shafts was moved away from its perpendicular position. Due to the fact that the helix angle of a globoid worm is variable in the axial plane because of the increased diameter of the worm at the large ends, the lines of contact are displaced thereby from the axial plane 26 into a twisted surface 33, said surface forming a locus at which the normal pitch of the worm and gear are the same. This is a disturbing influence in the theory of globoids as it produces an interference and wedging between the mating teeth, said interference rapidly increasing with the helix angle employed. I have surmounted this difficulty by my improved method of manufacture of the worm, as set forth in the above-mentioned applications Serial Numbers 346,232 and 277,693, according to which I pass the cutter transversely across the worm axis when generating the globoid threads and twist the cutter during its passage according to a predetermined lead of helix, thus removing all interferences in the worm thread. In such a manner, we arrive at a worm that is not an exact involute in any particular plane because the points of contact are displaced in a skew surface 33, as indicated in Fig. 4, however, along said surface a full involute contact in effect is obtained. This correction is particularly necessary when the helix angle D is considerable and also when a good workmanship is desired for lesser helix angles.

As the locus of contact 33, Figure 4, is divergent relative to the axial plane 26, the bearing area 34 of the sector tooth 27, Figure 6, is of a certain width $b$. This width is of the order of about ¼ inch for steering gears having seven or eight degrees helix angle and runs to as high as two or three inches for axle gears having a helix angle of about forty degrees.

By the virtue of this improved design, the worm and gear may now be displaced along their respective axes without losing the correct tangency of the mating surfaces and if the curves 25 and 28 are selected to be involutes, the displacement may be effected also along the line perpendicular to the axis of the worm and gear. Thus, given a mechanism in which either member may be displaced along three mutually perpendicular coordinates, it is readily seen that such a system is relatively displaceable also in any other direction within certain limits. Therefore, the worm may be slightly rocked in the plane of the gear and also perpendicularly thereto similar to a universal joint. This property is exceedingly valuable in the construction of steering gears as such gears may now be constructed to operate without backlash (to resist the hammering caused by the wheel shocks) and also to freely and easily operate by hand. The three displacements will now be discussed:

1. The sector may be displaced along its axis because its teeth are helical and of a uniform cross section throughout their lengths.

2. The worm may be displaced along its axis, i. e. at right angles to the first displacement. This is seen from Figure 5. Theoretically, this displacement may be effected only in the case when the gear axis is eccentric relative to the meridian axis and the mating curves are conjugate, i. e. developed from the same basic rack. Let the original pitch circle 29 of the sector having a center at $O_2$ be displaced either to the right into the circle 36 and center $O_3$, or to the left, circle 35 and center $O_4$, the displaced circles will be tangent in either event to the meridian circle 23 at the points E' and E'' respectively. To give a practical example, let the permissible tangential shift E' E'' be equal to one quarter inch and the eccentricity of the sector be equal to one sixteenth of its radius; in that case the permissible displacement along the axis of the worm will be one fourth multiplied by one sixteenth equals one sixty-fourth of an inch, a tolerance of great commercial value in building steering gears, or any other gears, in quantities.

The principle of conjugacy existing between the mating curves 25 and 28 when they are not involutes, but some other curves (one of them may be a straight line, for instance), as illustrated in Figure 8. Let us assume an arbitrary sector tooth curve 28 rotatable about the center $O_2$, said curve to have a pitch circle 29 and a pitch point E. We first generate the basic rack curve 44 by rolling the curve 28 upon the pitch line 43 of the rack and after obtaining the said rack curve, we generate the sought curve 25 by means of rolling the rack over the pitch circle 23 of the globoid. In this construction, the points H, H' and H'' are mutually conjugate and the normals $HK=H'K'=H''K''$ together with the developed arc lengths $EK=EK'=EK''$ are all correspondingly equal.

3. The worm and sector may be displaced along a line connecting the two axes, i. e. radially. This displacement canont be accomplished unless the mating curves 25 and 28 are both involutes. It is difficult to comprehend the theory of this displacement but the following kinematical analysis will be sufficient for this purpose:

Let the two pitch circles 23 and 29 contact at E (Figure 9) and have their centers at $O_1$ and $O_2$ respectively. The corresponding base circles are 30 and 31 having radii $O_1$ $B'$ and $O_2$ $B''$ respectively, both base circles being tangent to the common normal E $B''$ $B'$ of the mating involutes 25 and 28. As both gears have the same pressure angle F, as a consequence of the originally assumed tangency of the involutes 25 and 28, it is true that $$\frac{O_2E}{O_1E}=\frac{O_2B''}{O_1B'}$$

i. e. the pitch radii and the base radii are at a constant ratio, said ratio being determined by the corresponding numbers of teeth in the circles 29 and 23.

Let up now shift the center $O_1$ radially outwards to the new position $O_5$. This shifting will not affect the base radius $O_1B'=O_5M'$, nor will it affect the number of teeth and the ratio of transmission. Therefore, in the shifted position 42 of the base circle 30, the pitch radii of both gears must change if the two gears are to mesh.

Le the new pitch radii be $O_2$ M and $O_5$ M respectively, then the first requirement is that $$\frac{O_2M}{O_5M}=\frac{O_2E}{O_1E}$$

and the second requirement is that the common normal to the displaced pair of involutes 40 and 41 should be tangent both to the old base circle 31 of the sector and the new or displaced base circle 42 of the worm meridian. That these two conditions exist is readily proved in the case of involute curves, in which the base radius is always constant for any radius vector drawn to the curve from the center of rotation, from the similarity of the triangles E $B''$ $O_2$ and E $B'$ $O_1$ in the first case, and the triangles M $M''$ $O_2$ and M $M'$ $O_5$ in the second case, that is, after the displacement has been effected.

This problem would seem infinitely more mathematically difficult if the analysis were extended to include the globoids and mating helicoids, but I have proved experimentally that globoids when constructed according to the rules which are given here will behave in regard to the variability of centers in the same fashion as would an internal involute helical gear sector, i. e. they will permit the centers to vary within reasonable limits.

From the above, it will appear that a globoid worm of a concave inverted involute curvature in its threads possesses two striking advantages from the practical point of view, said advantages not being present in any other globoid worm. Both advantages are due to the same kinematic cause, viz., that the normals taken at any point of tangency of the mating surfaces are all equidistant from the axis of the gear. Thus first, the centers may be spread apart or contracted without losing the tangency as it was just shown and second, the torque arm and consequently the normal or maximum tooth load at any possible point of contact, that is, whether the said point lies at the tips or the roots of teeth, or whether it lies at one end or the other end, or in the middle of the worm, is always constant for a given delivered torque. This fact, naturally, gives a worm of an ideal or maximum load bearing ability.

In order to practically construct gearing in accordance with my invention, it is necessary to resort to mathematical formulas and in the following discussion, I have shown the development of these formulas. By means of the formulas, a designer may construct gearing according to my invention.

Let us denote with $p=EA'=EA''$ (Figure 3) the axial pitch of the worm and sector, with R and $r_2$ respectively the meridian and the pitch radius of the worm and sector and with N and $n_2$ the corresponding numbers of teeth in the completed circles, then $$p=\frac{2R\pi}{N}=\frac{2r_2\pi}{n_2} \quad (1)$$

from which $$\frac{r_2}{R}=\frac{n_2}{N} \quad (2)$$

and $$O_1O_2=R-r_2=\frac{p}{2\pi}(N-n_2) \quad (3)$$

We now select the factor $(N-n_2)$ to be as small as possible. For example let $$N-n_2=1 \quad (4)$$

That is, there is a difference of one tooth between the number of teeth in the mating gears.

In that case $$\frac{r_2}{R}=\frac{n_2}{n_2+1} \quad (5)$$

Equation 5 shows the advantage of selecting the member which has the greatest number of teeth of the pair of mating gears to be cylindrical and the smaller member to be globoid. In that case the intimacy of envelopment which is expressible by the value of the factor $$\frac{r_2}{R}$$

reaches its maximum. This is particularly true of steering gears in which the number of teeth in the sector circle (due to limited swing required of the sector) does not have to be an integer and the value of the difference $(N-n_2)$ Equation 3, may be made even smaller than one by employing a fractional number of teeth in the sector circle.

If we now assume an axial pressure angle F, the corresponding base radii $a$ and $a_2$ may be from this calculated, viz—

$$\cos F = \frac{a}{R} = \frac{a_2}{r_2} \quad (6)$$

Let now the helix angle of the worm and sector be denoted with D, the transverse pitch of the worm (Figure 4) with $p'$, the pitch radius of the worm (Figure 5) with $r_1$ and the number of worm threads or starts with $n_1$. Let, further, Q be the ratio of transmission, then $$Q = \frac{n_2}{n_1} \quad (7)$$

$$p' = \frac{2r_1\pi}{n_1} \quad (8)$$

$$\tan D = \frac{p}{p'} \quad (9)$$

from which $$p' = \frac{2r_2\pi}{n_2 \tan D} \quad (10)$$

and $$\frac{r_2}{r_1} = Q \tan D \quad (11)$$

Let now $$c = r_1 + r_2 \quad (12)$$

where $c$ denotes the center distance, Figure 4, then $$r_1 = \frac{c}{1 + Q \tan D} \quad (13)$$

and $$r_2 = \frac{cQ \tan D}{1 + Q \tan D} \quad (14)$$

The pitch radii $r_1$, and $r_2$ may now be readily computed from the Equations 13 and 14 because the right hand sides of the said equations contain only known or given quantities. The pitch and base radii R and $a$ respectively, of the cutter to generate the globoid may similarly be found from the Equations 2 and 4. It remains to find the lead of helix of the sector and that of the cutter to generate the worm with. Let $L_2$ be the lead of sector and L the lead of the cutter then $$L_2 = n_2 p' \quad (15)$$

and $$L = Np' \quad (16)$$

the value of $p'$ being first found from the Equations 8 or 9.

From the formulas given above, it is possible to construct worm gearing in accordance with my invention.

What I claim as my invention is:

1. A pair of mating gears consisting of a globoid worm having a plurality of spiral convolutions of thread disposed about its circumference and a gear member having a plurality of equispaced twisted teeth disposed about an axis in a circle in which the axis of the gear member is transverse to the worm axis and eccentric relative to the meridian axis of the globoid and in which the cross contours of the worm threads are of a curvature different from and conjugate to the cross contours of the gear member as measured in the plane of the gear member.

2. A pair of mating gears consisting of a globoid worm having a plurality of spiral thread convolutions and a cylindrical gear member having a plurality of equispaced teeth disposed about an axis in a circle, said teeth being of a uniform cross section throughout their lengths in order that the gear member may be shifted along its axis in which the gear axis is eccentric relative to the meridian curve of the worm and in which the worm thread cross contours are modified in their curvature to permit an axial shifting of the worm through a limited range without destroying the tangency of the mating surfaces.

3. A pair of mating gears comprising an hour-glass-shaped globoid worm having a plurality of spiral convolutions and a cylindrical gear member having a plurality of helically twisted teeth in which the radius of the meridian circle of the worm is greater than the pitch radius of the mating gear and in which the cross contours of the worm thread and the gear teeth are developed from the same basic rack by using two pitch circles of different corresponding radii.

4. A pair of mating gears comprising an hour-glass-shaped globoid worm having a plurality of spiral convolutions and a mating gear having a plurality of equispaced twisted teeth arranged about its circumference in which the axis of the gear is eccentric relative to the meridian of the worm, in which the cross contours of the worm thread are concave and the cross contours of the gear teeth are convex and in which the radii of curvature of the concave worm thread are greater at all conjugate points than the corresponding radii of the gear tooth profiles.

5. A pair of mating gears comprising an hour-glass-shaped globoid worm having a plurality of spiral convolutions and a mating gear having a plurality of equispaced teeth arranged about its circumference in which the axis of the gear is eccentric relative to the meridian of the worm, in which the meridan and the cross curves of the worm are all concave and of a greater radius of curvature than the corresponding pitch circle and convex cross contours of the gear teeth and in which the said radii of curvature of the concave surfaces are increased at a predetermined ratio corresponding to the distance at which the gear axis is offset from the meridian axis of the worm.

6. A pair of mating gears comprising a globoid worm having a plurality of spiral convolutions and a mating gear having a plurality of equispaced twisted teeth arranged in a circle about its circumference in which the cross contours of the worm threads in the axial plane are a series of concave curves of an ever increasing radius of curvature from the tip toward the roots of the said threads and the mating tooth profiles are convex and of a variable curvature, in which the axis of the gear is eccentric relative to the meridian of the worm and in which the normals drawn to the profiles in the plane of the gear are all substantially equidistant from the meridian axis of the worm for the purpose of equalizing the tooth loads at all phases of engagement.

7. A pair of mating gears comprising a globoid worm having a plurality of spiral thread convolutions and a mating gear having a plurality of equispaced twisted teeth arranged in a circle in which the axis of the gear is eccentric relative to the meridian circle of the worm in which the thread profiles taken in the axial plane of the worm are concave and of an inverted involute shape and the gear tooth profiles are involutes and convex at all contacting points thereof, in which the base radius of the first series of involutes is at an exact ratio with the respect to the base radius of the second series as is the radius of the meridian circle to the pitch radius of the gear.

8. A pair of mating gears comprising a globoid worm having a plurality of spiral thread convolutions and a mating gear having a plurality of uniformly twisted teeth arranged in a circle in which the radius of the meridian circle of the worm is greater than the pitch radius of the gear, in which the thread profiles of the worm are generated from a rolling circle greater than the circle from which the gear teeth are generated and in which the thread profiles of the worm are corrected above and below the axial plane of the same to avoid a helical interference caused by the variable helix angle of the globoid spiral.

9. A pair of mating gears comprising a globoid worm having a plurality of spiral thread convolutions and a mating wheel having a plurality of equispaced teeth distributed in a circle in which the worm thread profiles are generated from a meridian circle having a greater number of teeth than the mating gear, in which the worm threads are corrected above and below the axial plane to avoid interference, in which the said correction is such as might be effected by twisting a generating tool along a helix having the same angle of inclination as the pitch helix of the mating gear and in which the tool generating the worm is of such a curvature that it is capable of meshing with the same basic rack from which the gear teeth are generated.

10. A pair of mating gears comprising a globoid worm having a plurality of spiral thread convolutions and a mating gear having a plurality of twisted teeth distributed along a circle, in which the axis of the gear member is eccentric relative to the meridian circle of the worm, in which the thread profiles of the worm are generated from a circle having a number of teeth by one tooth greater than the mating gear and in which the tooth curves of the worm threads and the gear teeth respectively are of different curvatures and are generated from the same basic rack by means of two different pitch circles.

11. A pair of mating gears comprising a globoid worm having a plurality of spiral thread convolutions and a mating gear having a plurality of uniformly twisted helical teeth in which the cross contours of the worm thread and the contours of gear teeth are involutes of the same pitch and the same pressure angle but derived from two different base circles, in which the gear axis is eccentric relative to the meridian circle of the worm and in which the pitch of the gear teeth as measured in a direction parallel to the gear axis is exactly equal to the circular pitch of the globoid worm as measured in its gorge plane.

In testimony whereof I affix my signature.

NIKOLA TRBOJEVICH.